(12) United States Patent
Lee

(10) Patent No.: US 11,703,344 B2
(45) Date of Patent: Jul. 18, 2023

(54) LANDMARK LOCATION ESTIMATION APPARATUS AND METHOD, AND COMPUTER-READABLE RECORDING MEDIUM STORING COMPUTER PROGRAM PROGRAMMED TO PERFORM METHOD

(71) Applicant: SK TELECOM CO., LTD., Seoul (KR)

(72) Inventor: Seongsoo Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 172 days.

(21) Appl. No.: 17/425,284

(22) PCT Filed: Dec. 13, 2019

(86) PCT No.: PCT/KR2019/017743
§ 371 (c)(1),
(2) Date: Jul. 22, 2021

(87) PCT Pub. No.: WO2020/159076
PCT Pub. Date: Aug. 6, 2020

(65) Prior Publication Data
US 2022/0187095 A1 Jun. 16, 2022

(30) Foreign Application Priority Data
Jan. 28, 2019 (KR) .................. 10-2019-0010528

(51) Int. Cl.
*G01C 21/00* (2006.01)
*G01C 21/36* (2006.01)
*B60W 40/105* (2012.01)

(52) U.S. Cl.
CPC ....... *G01C 21/3644* (2013.01); *B60W 40/105* (2013.01); *G01C 21/3647* (2013.01); *B60W 2420/42* (2013.01)

(58) Field of Classification Search
CPC .. G05D 1/0607; G05D 1/0061; G05D 1/0676; G05D 1/102; G05D 1/0808;
(Continued)

(56) References Cited

U.S. PATENT DOCUMENTS

| 8,108,168 | B2 * | 1/2012 | Sharp | G06F 17/10 |
| | | | | 702/81 |
| 8,255,170 | B2 * | 8/2012 | Kollgaard | G06F 11/2294 |
| | | | | 702/34 |
| 2013/0038633 | A1 * | 2/2013 | Maggiore | B01L 99/00 |
| | | | | 29/407.01 |

FOREIGN PATENT DOCUMENTS

| KR | 10-0884904 B1 | 2/2009 |
| KR | 10-1569354 B1 | 11/2015 |

(Continued)

OTHER PUBLICATIONS

PCT International Search Report and Written Opinion, PCT/KR2019/017743, dated Apr. 2, 2020, 10 pages (with English translation of PCT International Search Report).

*Primary Examiner* — Ian Jen
(74) *Attorney, Agent, or Firm* — WTA Patents

(57) ABSTRACT

In accordance with an aspect of the present disclosure, there is provided a landmark position estimating method performed by a landmark position estimating apparatus. The method comprises, identifying a first type landmark and a second type landmark from an image, captured by an image capturing device of a vehicle, including various landmarks on a driving route, estimating a three-dimensional position of the identified first type landmark based on a plurality of the images on which the first type landmark is identified and a digital map including a driving area of the vehicle, and estimating a position of the identified second type landmark on a virtual plane including the three-dimensional position of the first type landmark.

20 Claims, 17 Drawing Sheets

(58) Field of Classification Search
CPC .. G05D 1/0077; G05D 1/0669; G05D 1/0816; G05D 1/085; G05D 1/101; G05D 1/0055; G05D 1/0623; G05D 1/0688; G05D 1/0825; G05D 1/0033; G05D 1/0088; G05D 1/0202; G05D 1/0684; G05D 1/0005; G05D 1/0016; G05D 1/0022; G05D 1/0044; G05D 1/0066; G05D 1/0094; G05D 1/0204; G05D 1/042; G05D 1/063; G05D 1/0638; G05D 1/0646; G05D 1/0653; G05D 1/104; G05D 1/106; G05D 1/1064; G05D 1/12; B64C 27/57; B64C 27/56; B64C 13/18; B64C 13/042; G01C 21/00; G01C 21/165; G01C 5/005; G01C 9/005
See application file for complete search history.

(56) References Cited

FOREIGN PATENT DOCUMENTS

| | | |
|---|---|---|
| KR | 10-2018-0101717 A | 9/2018 |
| KR | 10-2018-0123558 A | 11/2018 |
| WO | WO 2018104563 A2 | 6/2018 |

\* cited by examiner

LANDMARK LOCATION ESTIMATION APPARATUS AND METHOD, AND COMPUTER-READABLE RECORDING MEDIUM STORING COMPUTER PROGRAM PROGRAMMED TO PERFORM METHOD

TECHNICAL FIELD

The present disclosure relates to an apparatus for estimating a position of various landmarks on a driving route, a method thereof, and a computer-readable storage medium storing a computer program programmed to execute the method. For reference, this application claims priority to Korean Patent Application No. 10-2019-0010528, filed on Jan. 28, 2019. The entire contents of the application on which the priority is based are incorporated herein by reference.

BACKGROUND

In general, vehicles mean transportation machines driving roads or tracks using fossil fuel, electricity, and the like as a power source.

The vehicle has been developed to provide various functions to a driver according to development of technology. Particularly, according to the trend of vehicle electrification, a vehicle with a vehicle navigation equipment has widely popularized. The vehicle navigation equipment may be provided in a form embedded in the vehicle, or may be mounted on the vehicle in a form of a separate product.

In addition, the vehicle navigation equipment may be installed in a form of an application program in various information processing devices such as a smartphone having a high-level calculation function.

A main function of the vehicle navigation equipment includes displaying a route to a destination on a digital map, providing route information through the voice, displaying various information for safe driving on the digital map, or providing the various information through the voice. For example, the information for safe driving includes guidance on the degree of curvature of the driving route, guidance on the speed limit under the Traffic Law, and guidance on positions of speed limit enforcement. In the case of the guidance on the positions of the speed limit enforcement, it lowers the risk of accidents caused by sudden changes in driving speed by providing, in advance, information on installation positions of speed cameras or positions of point-to-point speed enforcement so that the driver can recognize it.

On the other hand, the speed camera is an equipment for capturing a vehicle traveling at a speeding speed, and has the effect of lowering the risk of an accident by inducing the driver not to speed. The speed camera is usually mounted on a structure installed on the driving route of the vehicle such as a road.

However, since such speed cameras are expensive to purchase and operate, the installation positions are changed to increase the speeding prevention effect rather than increasing the number of installations on the road.

Accordingly, in order for the vehicle navigation equipment to accurately provide information for safe driving including the guidance on the positions of the speed limit enforcement, it is necessary to always keep, up to date, the information on positions of the speed limit enforcement including the installation positions of the speed cameras.

SUMMARY

As part of an effort to reduce maintenance costs to keep the information on positions of the speed limit enforcement on a driving route of a vehicle up to date, and an effort to improve reliability of the information on installation positions of the speed cameras, a method of combining image capturing and a machine learning method through image analysis may be considered. An image including the speed camera by using the image capturing device mounted on the vehicle may be obtained, and then the speed camera on the image by using the machine learning method through the image analysis may be identified, thereby estimating a position where the image including the speed camera is captured as an installation position of the speed camera.

However, unlike traffic signs such as speed limit signs or speeding warning signs, the speed camera has low image identification, so the machine learning method through the image analysis may not reliably identify the speed camera within the image, thus the reliability of the information on the installation position of the speed camera may not be guaranteed.

In accordance with an aspect of the present disclosure, there is provided a landmark position estimating method performed by a landmark position estimating apparatus. The method comprises, identifying a first type landmark and a second type landmark from an image, captured by an image capturing device of a vehicle, including various landmarks on a driving route, estimating a three-dimensional position of the identified first type landmark based on a plurality of the images on which the first type landmark is identified and a digital map including a driving area of the vehicle, and estimating a position of the identified second type landmark on a virtual plane including the three-dimensional position of the first type landmark.

In accordance with another aspect of the present disclosure, there is provided a non-transitory computer-readable storage medium storing a computer program, wherein the computer program includes an instruction, when executed by a processor, cause the processor to perform the landmark position estimating method.

In accordance with still another aspect of the present disclosure, there is provided a landmark position estimating apparatus. The landmark position estimating apparatus comprises an image processing unit configured to identify a first type landmark and a second type landmark from an image, captured by an image capturing device of a vehicle, including various landmarks on a driving route, a storage unit configured to store a digital map including a driving area of the vehicle, and a control unit configured to estimate a three-dimensional position of the identified first type landmark based on a plurality of the images on which the first type landmark is identified and the digital map, and to estimate a position of the identified second type landmark on a virtual plane including the three-dimensional position of the first type landmark.

According to an embodiment, an apparatus and a method for reliably estimating a position of a landmark, such as the speed camera, installed on a driving route of a vehicle, and a computer-readable storage medium storing a computer program programmed to execute the landmark position estimating method are provided.

According to an embodiment, at first, a three-dimensional position of a landmark having relatively high image identification among various landmarks included in an image captured during driving of the vehicle is estimated. Thereafter, based on the estimated three-dimensional position, the position of the landmark with relatively low image identification is estimated. For example, when estimating the position of the speed camera among landmarks on the driving route, a three-dimensional position of the traffic sign such as the speed limit sign including a number or the speeding warning sign including a letter installed on the same structure on which the speed camera is mounted may be estimated in advance. Thereafter, the position of the speed camera may be estimated based on the three-dimensional position of the traffic sign.

Accordingly, it is possible to quickly estimate the position information of the landmark having relatively low image identification, and the reliability of the estimated position information may be improved as much as that of a landmark having relatively high image identification.

If an embodiment of the present disclosure is used for the purpose of keeping the information on a position, on a vehicle navigation equipment, of the speed limit enforcement on the driving route of the vehicle in an up-to-date state, the maintenance cost may be reduced and the reliability of information on the installation position of the speed camera may be improved.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Hereinafter, referring to FIG. 1 through FIG. 16, a landmark position estimating apparatus and a landmark position estimating method according to an embodiment of the present disclosure will be described.

Figure 1:
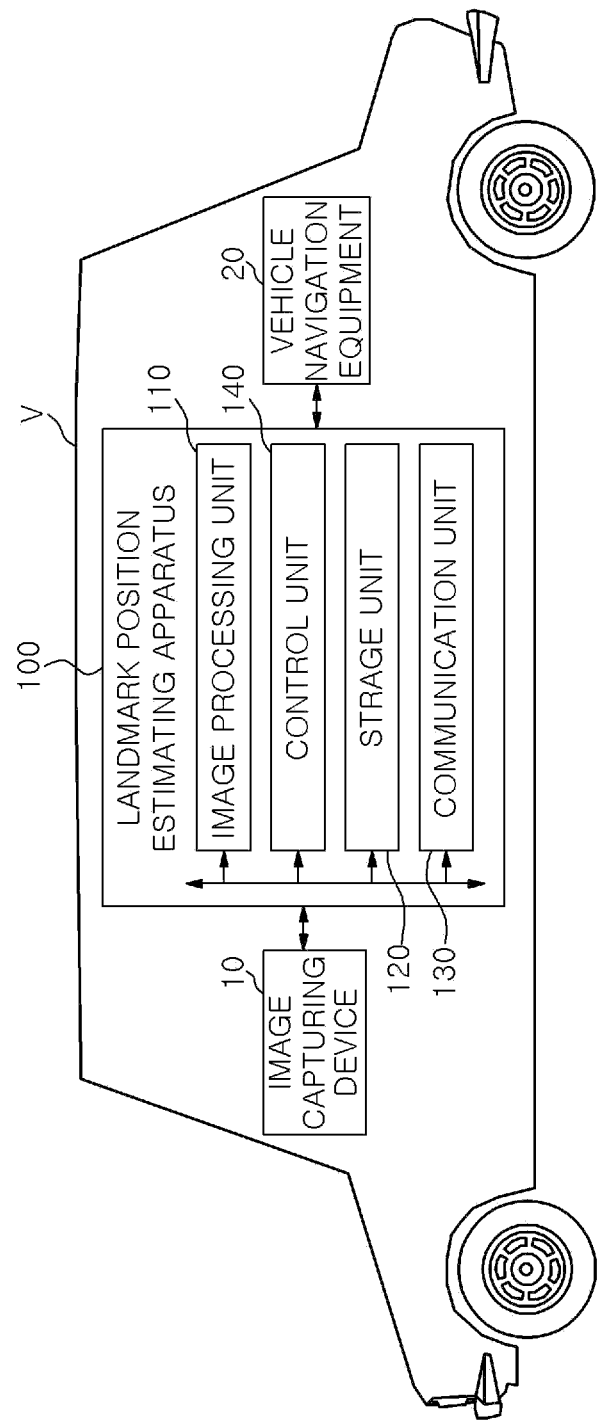
FIG. 1 shows a diagram illustrating a configuration of a landmark position estimating system according to an embodiment of the present disclosure.
Figure 2:
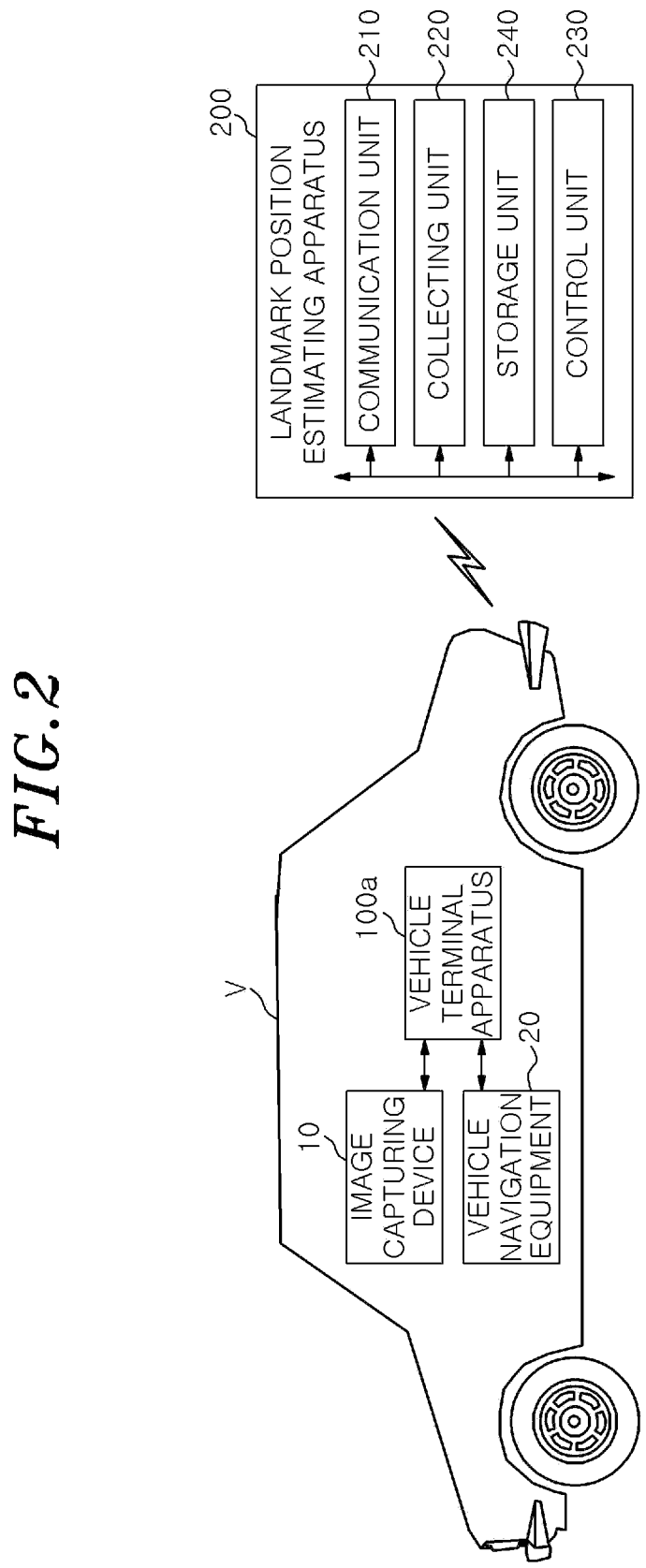
FIG. 2 shows a diagram illustrating a configuration of a landmark position estimating system according to another embodiment of the present disclosure.

FIG. 1 shows a diagram illustrating a configuration of a landmark position estimating system according to an embodiment of the present disclosure, and FIG. 2 shows a diagram illustrating a configuration of the landmark position estimating system according to another embodiment of the present disclosure.

In the landmark position estimating system according to an embodiment, as shown in FIG. 1, a landmark position estimating apparatus 100 may be mounted on a vehicle V, and may interwork with an image capturing device 10 and a vehicle navigation equipment 20 mounted on the vehicle V. One or more of the image capturing device 10, the vehicle navigation equipment 20, and the landmark position estimating apparatus 100 may be implemented integrally.

In the landmark position estimating system according to another embodiment, as shown in FIG. 2, the image capturing device 10 and the vehicle navigation equipment 20 may be mounted on the vehicle V, and a vehicle terminal apparatus 100a that supports the image capturing device 10 and the vehicle navigation equipment 20 interworking with a landmark position estimating apparatus 200 may be mounted on the vehicle V. One or more of the image capturing device 10, the vehicle navigation equipment 20, and the vehicle terminal apparatus 100a may be implemented integrally. For example, the vehicle terminal apparatus 100a may include a computing device such as a microprocessor. Although one vehicle V is shown in FIG. 2, there may be a plurality of the vehicles V on which the image capturing device 10, the vehicle navigation equipment 20, and the vehicle terminal apparatus 100a are mounted, and the landmark position estimating apparatus 200 may perform communication to interwork with a plurality of the vehicle terminal apparatuses 100a mounted on a plurality of the vehicles V.

The vehicle V may indicate a transportation means capable of moving humans, objects, or animals from one position to another while driving along a road or a track. The vehicle V according to an embodiment may include a vehicle with three wheels or a vehicle with four wheels, a vehicle with two wheels such as a motorcycle, a construction machine, a motor bicycle, a bicycle, and a train running on a track.

The image capturing device 10 or the vehicle navigation equipment 20 mounted on the vehicle V may include a Global Position System (GPS) module, and thus may receive a GPS signal from a GPS satellite through the GPS module, and may obtain position information based on the received GPS signal.

The image capturing device 10 may be an information processing device such as a smartphone including a camera or a dashboard camera for a vehicle including a camera. Alternatively, the image capturing device 10 may be a dedicated camera mounted on the vehicle V for the landmark position estimating apparatus 100 or 200. In the image capturing device 10, a plurality of cameras may be provided to face the front, side, and/or rear of the vehicle V, and may capture image in each corresponding direction. The captured image may serve as a basis for obtaining information on various landmarks such as traffic lanes and traffic signs as well as objects around the vehicle V through an image processing process.

A digital map including a driving area of the vehicle V may be stored in advance in the vehicle navigation equipment 20, and the vehicle navigation equipment 20 may provide a navigation service based on the digital map and the GPS signal, for example, route information according to traveling of the vehicle V or various information for safety driving. Herein, the digital map may indicate a map that has high accuracy for safe and precise control over the vehicle V, and includes information on an altitude, slope, curvature, etc., as well as a planar position of the driving route. In addition, the digital map may indicate a map further including information (for example, a landmark identifier, etc.) on the various landmarks on the road such as the traffic lanes, the traffic signs, the speed cameras, the traffic lights, and guardrails.

Referring to FIG. 1, the landmark position estimating apparatus 100 may include an image processing unit 110, a storage unit 120, a communication unit 130, and a control unit 140 in order to estimate the positions of various landmarks on the driving route of the vehicle V.

The image processing unit 110 of the landmark position estimating apparatus 100 may identify a first type landmark and a second type landmark from the image, captured by the image capturing device 10 of the vehicle V, including various landmarks on the driving route. For example, the first type landmark may be a traffic sign including a letter such as a speeding warning sign or a traffic sign including a number such as a speed limit, and the second type landmark may be the speed camera that does not include any letters or any numbers.

The digital map including the driving area of the vehicle V may be stored in advance in the storage unit 120 of the landmark position estimating apparatus 100. The digital map may indicate the map including the information on the altitude, slope, curvature, etc., as well as the planar position of the driving route. In addition, the digital map may indicate the map further including the information (for example, the landmark identifier, etc.) on the various landmarks such as the traffic lanes, the traffic signs, the speed cameras, the traffic lights, and the guardrails. The storage unit 120 may store a computer program that causes a processor to perform the landmark position estimating method according to various embodiments. For example, the storage unit 120 may indicate a computer-readable medium, for example, magnetic media such as hard disks, floppy disks, and magnetic tapes, optical media such as CD-ROMs and DVDs, magneto-optical media such as floptical disks, and a hardware device specially configured to store and execute program commands such as a flash memory.

The communication unit 130 of the landmark position estimating apparatus 100 may transmit and receive information by performing communication with the image capturing device 10 and the vehicle navigation equipment 20 under the control of the control unit 140 through various publicly-known communication methods. The communication unit 130 may communicate with the image capturing device 10 and the vehicle navigation equipment 20 through a wired channel or a wireless channel. For example, the communication unit 130 may perform communication by adopting the publicly-known communication method such as Near Field Communication (NFC), wireless LAN, Wi-Fi, Bluetooth, Zigbee, Wi-Fi Direct (WFD), Ultra wideband (UWB), Infrared Data Association (IrDA), Bluetooth Low Energy (BLE), Code-Division Multiple Access (CDMA), Global System for Mobile Communications (GSM), Wideband-CDMA (W-CDMA), and Long Term Evolution (LTE), etc. The communication method by the communication unit 130 is not limited to the above-described embodiment.

The control unit 140 of the landmark position estimating apparatus 100 may estimate a three-dimensional position of the first type landmark among landmarks based on the digital map stored in the storage unit 120 and a plurality of images captured by the image capturing device 10, and then may estimate a position of the second type landmark among the landmarks on a virtual plane including the three-dimensional position of the first type landmark. The control unit 140 may control the image processing unit 110, the storage unit 120, and the communication unit 130, and may perform the landmark position estimating method according to various embodiments of the present disclosure which will be described below with reference to FIGS. 3, 5, 7, 9, and 12. For example, the control unit 140 may include the computing device such as the microprocessor.

Referring to FIG. 2, the landmark position estimating apparatus 200 may include a communication unit 210, a collecting unit 220, a storage unit 230, and a control unit 240 in order to estimate positions of various landmarks on the driving route of the vehicle V.

The communication unit 210 of the landmark position estimating apparatus 200 may transmit and receive information by performing communication with the vehicle terminal apparatus 100a through various publicly-known communication methods under the control of the control unit 240. The communication unit 210 may communicate with the vehicle terminal apparatus 100a through the wired channel or the wireless channel. For example, the communication unit 210 may perform the communication by adopting the publicly-known communication method such as the NFC, wireless LAN, Wi-Fi, Bluetooth, Zigbee, WFD, UWB, IrDA, BLE, CDMA, GSM, W-CDMA, LTE, etc. The communication method by the communication unit 210 is not limited to the above-described embodiment.

The collecting unit 220 of the landmark position estimating apparatus 200 may collect various data from the vehicle terminal apparatuses 100a of a plurality of the vehicles V through the communication unit 210 under the control of the control unit 240, and may provide the various data to the control unit 240. For example, the various data provided to the control unit 240 from the collecting unit 220 may include not only an image captured by the image capturing device 10, but also a GPS signal of the vehicle navigation equipment 20 or position information of the vehicle V. Alternatively, the various data provided by the collecting unit 220 to the control unit 240 may include data calculated by the vehicle terminal apparatus 100a for a landmark position estimating method according to another embodiment. For example, the collecting unit 220 may include the computing device such as the microprocessor.

The digital map including driving areas of a plurality of the vehicles V may be stored in advance in the storage unit 230 of the landmark position estimating apparatus 200. The digital map may indicate the map including information on the altitude, slope, curvature, etc., as well as the planar position of the driving route. In addition, the digital map may indicate a map further including information (for example, a landmark identifier, etc.) on the various landmarks such as the traffic lanes, traffic signs, speed cameras, traffic lights, and guardrails. The storage unit 230 may store a computer program that causes a processor to perform the landmark position estimating method according to various embodiments. For example, the storage unit 230 may indicate the computer-readable medium, for example, the magnetic media such as the hard disks, floppy disks, and magnetic tapes, the optical media such as the CD-ROMs and DVDs, the magneto-optical media such as the floptical disks, and the hardware device specially configured to store and execute program commands such as the flash memory.

The control unit 240 of the landmark position estimating apparatus 200 identify a first type landmark and a second type landmark on the image, captured by the image capturing device mounted on each of the plurality of the vehicles V, including the various landmarks on the driving route. In addition, the control unit 240 estimates a three-dimensional position of the first type landmark based on the digital map including the driving areas of the plurality of the vehicles V and the images captured by the image capturing devices 10 mounted on the plurality of the vehicles V. Further, the control unit 140 may determine a final three-dimensional position of the first type landmark based on the three-dimensional positions of the first type landmark, respectively estimated based on the images captured by the image capturing devices 10 mounted on the plurality of the vehicles V. Furthermore, the control unit 240 obtains, as a candidate group, intersections of a virtual plane including the final three-dimensional position of the first type landmark and three-dimensional direction vectors passing coordinates identified as the second type landmark on the image captured by each of the image capturing devices 10 from the origin of a coordinate system of each image capturing device 10 mounted on the plurality of the vehicles V. In addition, the control unit 240 may determine a final position of the second type landmark based on the obtained candidate group. For these various operations, the control unit 240 may include the computing device such as the microprocessor. For example, the first type landmark may be the traffic sign including a letter such as the speeding warning sign or the traffic sign including a number such as the speed limit, and the second type landmark may be the speed camera that does not include any letters or any numbers.

The control unit 240 may control the communication unit 210, the collecting unit 220, and the storage unit 230, and may perform the landmark position estimating method according to various embodiments of the present disclosure which will be described below with reference to FIGS. 3, 5, 7, 9, 12, and 15.

In addition, the vehicle terminal apparatus 100a may share a role of the landmark position estimating apparatus 200 by performing a role performed by the landmark position estimating apparatus 100 as well as the function of supporting the landmark position estimating apparatus 200 to interwork with the image capturing device 10 and the vehicle navigation equipment 20. For example, the vehicle terminal apparatus 100a may identify the first type landmark and the second type landmark on the image, captured by the image capturing device 10 of the vehicle V on which the vehicle terminal apparatus 100a is mounted, including various landmarks on the driving route. Further, the vehicle terminal apparatus 100a may estimate the three-dimensional position of the first type landmark among landmarks based on the digital map stored in advance and a plurality of images captured by the image capturing devices 10. Furthermore, the vehicle terminal apparatus 100a may transmit information on the estimated three-dimensional position of the first type landmark to the landmark position estimating apparatus 200.

First, the landmark position estimating method according to an embodiment that may be performed by the landmark position estimating apparatus 100 or 200 will be described with reference to FIGS. 1 to 15.

Figure 3:
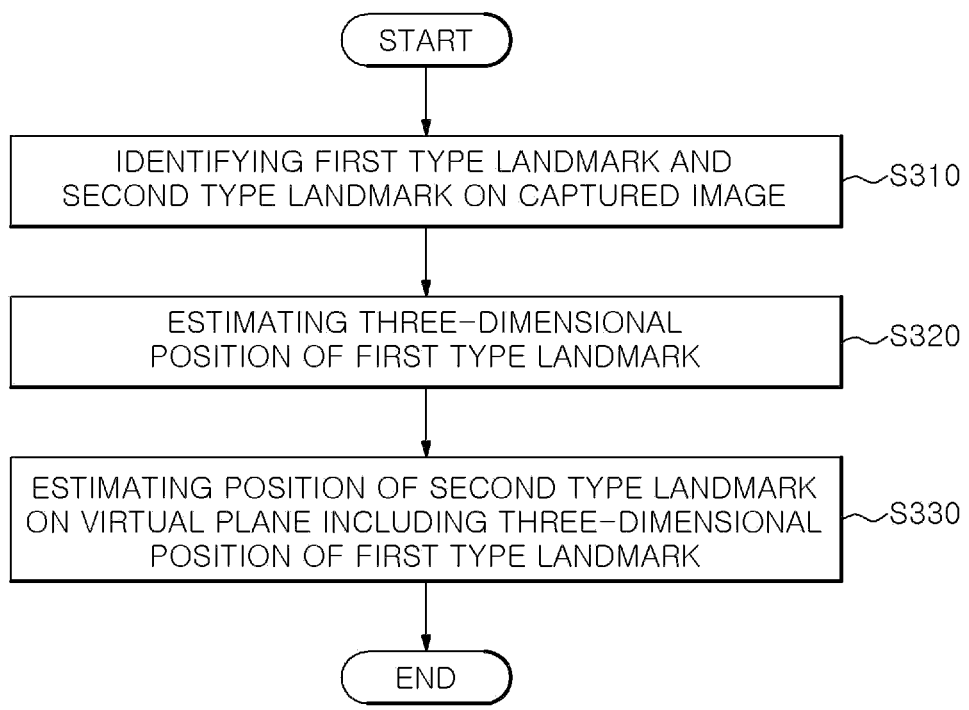
FIG. 3 shows a flowchart illustrating a landmark position estimating method according to an embodiment of the present disclosure.

Referring to FIG. 3, the image capturing device 10 of the vehicle V captures an image including various landmarks on a driving route of the vehicle V, and transmits the captured image to the landmark position estimating apparatus 100 or 200. Then, in a step S310, the landmark position estimating apparatus 100 or 200 identifies a first type landmark and a second type landmark among landmarks included on the image captured by the image capturing device 10. For example, the landmark position estimating apparatus 100 or 200 may identify the first type landmark and the second type landmark by using a publicly-known machine learning method through image analysis.

Figure 4:
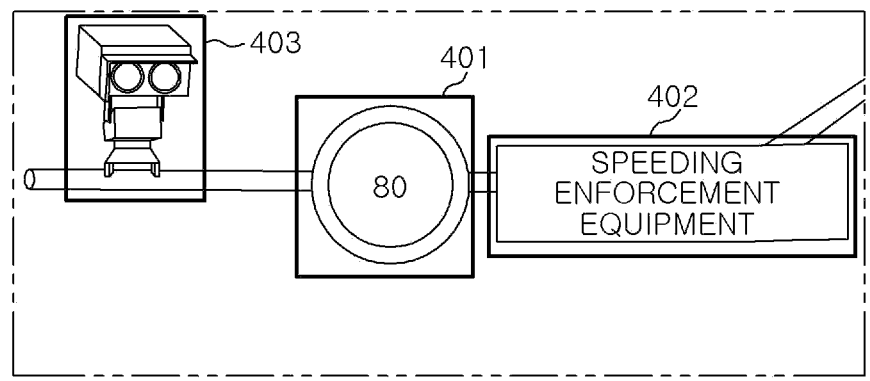
FIG. 4 shows a diagram illustrating a first type landmark and a second type landmark installed on a driving route of a vehicle.

Referring to FIG. 4, a traffic sign 401 including a number such as a speed limit, a traffic sign 402 including a letter such as a speeding warning sign, and a speed camera 403 where any letters or any numbers are not included may be installed together on a single structure on a driving route of the vehicle V. Among them, a landmark with relatively high image identification, caused by a number or a letter therein, may be classified as the first type landmark, and a landmark, not including any numbers or any letters, with relatively low image identification may be classified as a second type landmark.

Referring back to FIG. 3, the landmark position estimating apparatus 100 or 200 may learn in advance image feature information of the first type landmark and image feature information of the second type landmark. Thereafter, the landmark position estimating apparatus 100 or 200 may identify, on the image, pixels or coordinates where the first type landmark exists and pixels or coordinates where the second type landmark exists by analyzing the image captured by the image capturing device 10 based on the learned image feature information. At this time, an identification error in identifying the second type landmark that has relatively lower image identification than the first type landmark or an identification error in identifying the pixels or the coordinates of the second type landmark may occur. However, since a position of the second type landmark is estimated with high reliability based on a three-dimensional position of the first type landmark although the identification error occurred, the identification error may not affect the estimation of the position of the second type landmark.

Thereafter, in a step S320, the landmark position estimating apparatus 100 or 200 estimates the three-dimensional position of the first type landmark by using a plurality of images on which the same first type landmark is captured.

Figure 5:
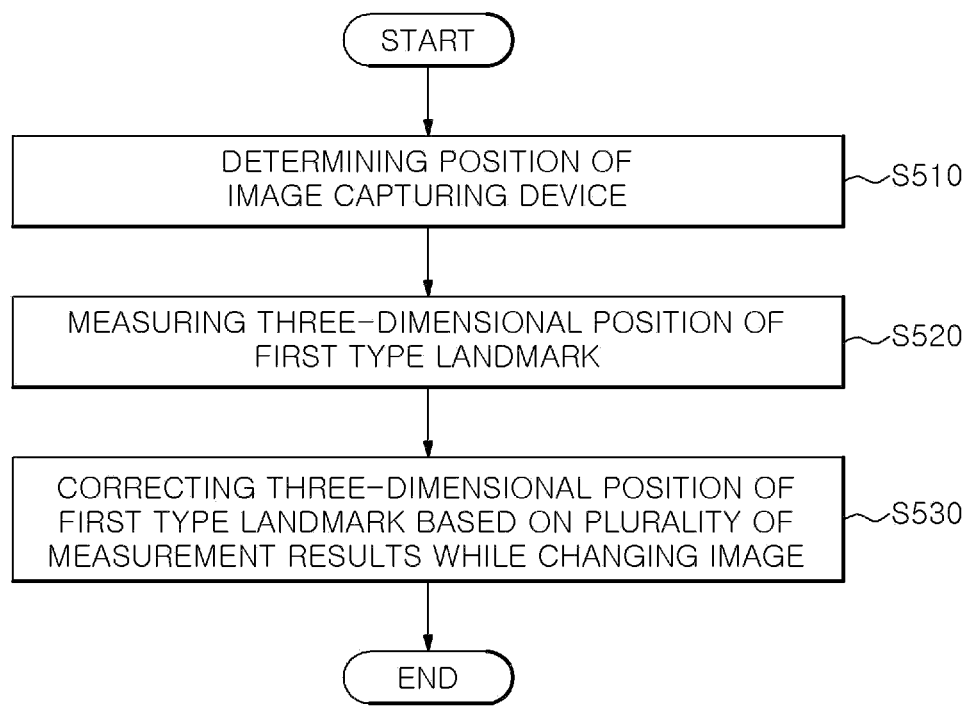
FIG. 5 shows a flowchart illustrating a method of estimating a three-dimensional position of a first type landmark according to an embodiment of the present disclosure.

An embodiment in which the landmark position estimating apparatus 100 or 200 estimates the three-dimensional position of the first type landmark through the step S320 is illustrated in detail in FIG. 5.

Referring to FIG. 5, in a step S510, the landmark position estimating apparatus 100 or 200 determines each position at which each of a plurality of images is captured by the image capturing devices 10. In other words, the positions of the image capturing device 10 that captured each image are respectively determined. For example, when an image is captured by the image capturing device 10, the landmark position estimating apparatus 100 or 200 may determine position information by the vehicle navigation equipment 20 as the position of the image capturing device 10. However, since the vehicle navigation equipment 20 and the image capturing device 10 may be far apart from each other, the position of the image capturing device 10 may be determined more accurately.

A process in which the landmark position estimating apparatus 100 or 200 determines the position of the image capturing device 10 will be described with reference to FIGS. 6 to 9.

Figure 6:
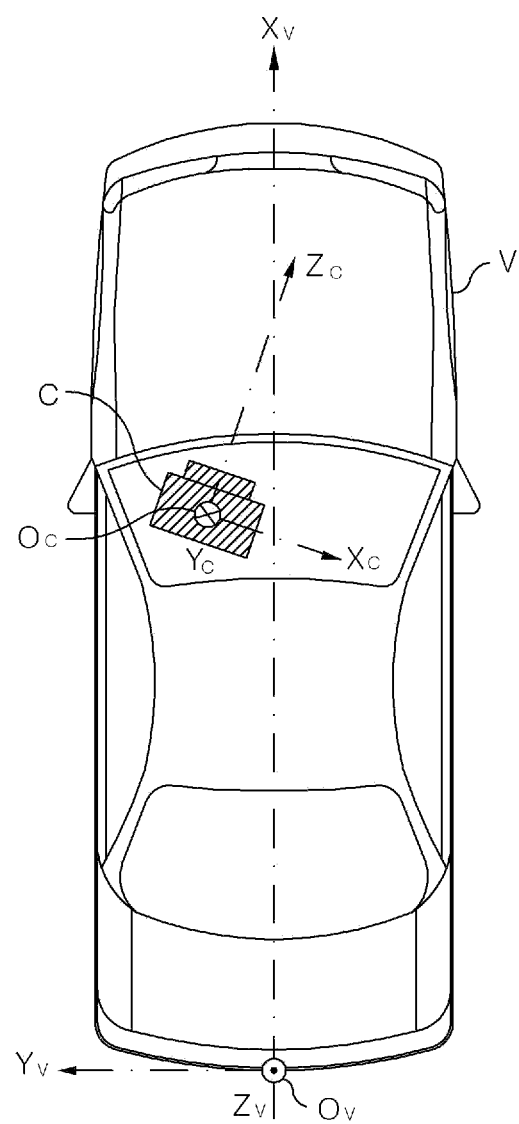
FIG. 6 shows a diagram illustrating each coordinate system of a vehicle and an image capturing device according to an embodiment of the present disclosure.

FIG. 6 shows a diagram illustrating each coordinate system of the vehicle V and the image capturing device 10 according to an embodiment, more specifically, illustrates a vehicle coordinate system of the vehicle V and a camera coordinate system of a camera C mounted on the vehicle V. The vehicle V may have the vehicle coordinate system including an $O_V$ as an origin, an $X_V$ axis in a driving direction of the vehicle V, a $Z_V$ axis perpendicular to the ground, and a $Y_V$ axis perpendicular to the $X_V$ axis and the $Z_V$ axis. On the other hand, the camera C mounted on the vehicle V may have the camera coordinate system including an $O_C$ as the origin, and an $X_C$ axis, a $Y_C$ axis, and a $Z_C$ axis, which are determined according to an installation position and an attitude angle. In order to combine two pieces of information which are on different coordinate systems, unification of the coordinate systems, which is referred to as camera calibration, may be performed.

To this end, the camera calibration may be performed before the vehicle V is driven. Specifically, a recognition pattern image for correction may be obtained by using the camera C mounted on the vehicle V, and the attitude angle and the installation position at which the camera C is mounted may be manually obtained by using the obtained recognition pattern image. As another example, a traffic lane may be recognized through the camera C while driving of the vehicle V, and the attitude angle of the camera C may be obtained by identifying a position of a vanishing point based on the recognized traffic lane.

The landmark position estimating apparatus 100 or 200 may estimate position information of the camera C by matching the image captured by the camera C with a landmark on a digital map. Accurate position information of the camera C may be used for the matching of the image and the digital map. However, since the vehicle coordinate system of the vehicle V and the camera coordinate system of the camera C may be set differently as described above, conversion of the coordinate system may be performed. In addition, since GPS-based initial position information of the vehicle V may not be accurate in an area where high-rise buildings are densely concentrated, the camera calibration of the camera C may be performed before estimating the position of the camera C.

Figure 7:
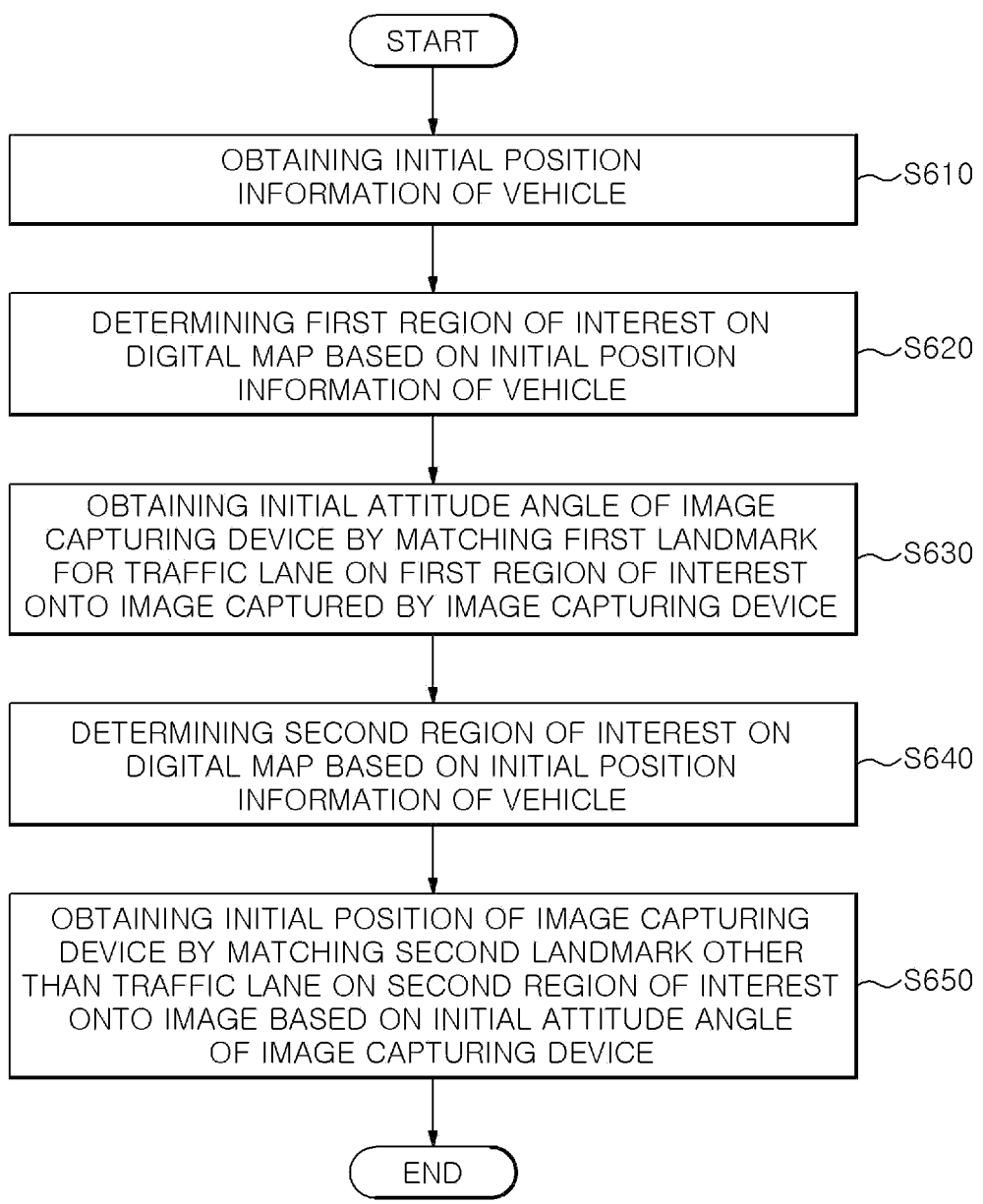
FIG. 7 shows a flowchart illustrating a method of obtaining initial position information of an image capturing device according to an embodiment of the present disclosure.
Figure 8:
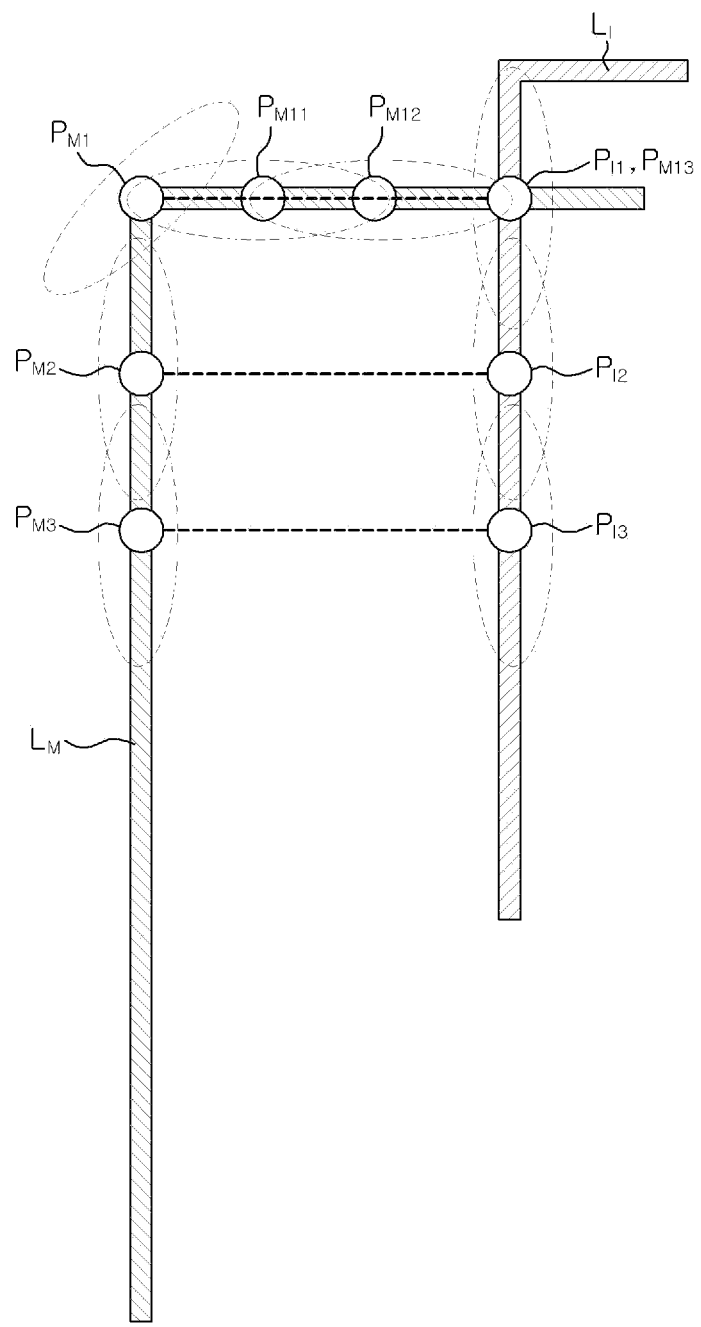
FIG. 8 shows a diagram illustrating a landmark matching method according to an embodiment of the present disclosure.

FIG. 7 shows a flowchart illustrating a method of obtaining initial position information of the camera C according to an embodiment, and FIG. 8 shows a diagram illustrating a landmark matching method according to an embodiment.

Referring to FIG. 7, in a step S610, initial position information, based on GPS information, of the vehicle V may be obtained, and an initial position of the camera C may be obtained based on the obtained initial position information of the vehicle V.

The landmark position estimating apparatus 100 or 200 may repeatedly obtain an $X_V$ axis indicating a driving direction of the vehicle V based on the initial position of the vehicle V, and an $Z_V$ axis in a vertical direction from the ground which is determined by a traffic lane on the digital map. Thereafter, landmark position estimating apparatus 100 or 200 may obtain a $Y_V$ axis by performing a cross product of the $X_V$ axis and the $Z_V$ axis. Further, considering a possibility that the obtained $X_V$ axis and the obtained $Y_V$ axis may not be perpendicular to each other because of an error inherent in the initial position of the vehicle V that is based on the GPS information, the $X_V$ axis may be corrected by performing a cross product of the $Y_V$ axis and the $Z_V$ axis.

Through those described above, the landmark position estimating apparatus 100 or 200 may obtain three-dimensional coordinates indicating the initial position of the camera C and an axis of a three-dimensional coordinate system indicating an initial attitude angle of the camera C.

Thereafter, in a step S620, the landmark position estimating apparatus 100 or 200 may determine a first region of interest based on the initial position information of the vehicle V on the digital map. Specifically, the landmark position estimating apparatus 100 or 200 may determine an area within a first radius around the initial position information of the vehicle V as the first region of interest. For example, the first radius may be several meters or less.

When the first region of interest is determined, in a step S630, the landmark position estimating apparatus 100 or 200 may obtain the initial attitude angle of the camera C by matching a first type landmark for a traffic lane existing on the first region of interest onto an image captured by the camera C. Specifically, the landmark position estimating apparatus 100 or 200 may obtain a rotation matrix R for the initial attitude angle of the camera C according to Equation 1.

$$S^* = \underset{T}{\operatorname{argmin}} \sum_k \{Z_k - h(T, R, P_k)\}^T \qquad \text{[Equation 1]}$$

$$(C_{Z_k} + H C_{P_k} H^T)^{-1} \{Z_k - h(T, R, P_k)\}$$

Herein, a solution $S^*$ of Equation 1 may indicate the initial position information including the rotation matrix R for the initial attitude angle of the camera C and a translation matrix T for the initial position of the camera C. $Z_k$ may indicate coordinates of the traffic lane detected from the image. $P_k$ may indicate coordinates of a landmark on the digital map corresponding to $Z_k$. $C_{Z_k}$ and $C_{P_k}$ may indicate covariance representing an error for $Z_k$ and $P_k$ respectively. H may indicate a partial derivative of a function h( ) which is a Jacobian matrix). In addition, the function h( ) may indicate a function projecting the coordinates of the landmark on the digital map onto the image, which may be defined according to Equation 2.

$$h(T,R,P)=K(R \times P+T) \qquad \text{[Equation 2]}$$

Herein, T may indicate the translation matrix for the initial position of the camera C, R may indicate the rotation matrix for the initial attitude angle of the camera C. P may indicate the coordinates of the landmark on the digital map. K may indicate an intrinsic parameter matrix of the camera C for projecting coordinates based on the camera coordinate system onto the image captured by the camera C.

To obtain the solution S* of Equation 1, the landmark position estimating apparatus 100 or 200 may select at least one of publicly-known algorithms, for example, a Gauss Newton algorithm or a Levenberg-Marquardt algorithm.

FIG. 8 shows a diagram illustrating a Point Cloud Set $L_I$ including feature points $P_{I1}$, $P_{I2}$, and $P_{I3}$ and a Point Cloud Set Lm including feature points $P_{M1}$, $P_{M2}$, $P_{M3}$, $P_{M11}$, $P_{M12}$, and $P_{M13}$ on a two-dimensional space. An area with a dashed line may indicate covariance of an internal feature point.

Referring to FIG. 8, the covariance of the feature point of the Point Cloud Set of a landmark extending in one direction such as a traffic lane may be an elliptical shape formed in the extending direction. Based on above description, the landmark position estimating apparatus 100 or 200 may match the first type landmark onto the image by repeatedly calculating the solution of Equation 1 by using the feature points closest to each other as a corresponding relationship. Feature points connected by a bold dashed line in FIG. 8 may represent a mutual corresponding relationship.

When Equation 1 is calculated in order to match the first type landmark for the traffic lane extending in one direction onto the image, an error may be large in a longitudinal direction in which the traffic lane extends, whereas an error may be small in a lateral direction. As a result, the rotation matrix R for the initial attitude angle of the camera C may have reliable accuracy.

On the other hand, the translation matrix T for the initial position of the camera C may be inaccurate compared to the rotation matrix R. Therefore, the landmark position estimating apparatus 100 or 200 may obtain the translation matrix T for the initial position of the camera C by matching a second landmark other than the traffic lane onto the image. Specifically, in a step S640, the landmark position estimating apparatus 100 or 200 may determine, on the digital map, a second region of interest based on the initial position information of the vehicle V. Specifically, the landmark position estimating apparatus 100 or 200 may determine an area within a second radius, which is equal to or greater than the first radius, around the initial position information of the vehicle V as the second region of interest. The initial attitude angle among the initial position information of the camera C may be obtained in order to accurately obtain the initial position of the camera C by using the landmark within a wider range. Herein, the second radius may be several hundred meters or less.

Thereafter, in a step S650, the landmark position estimating apparatus 100 or 200 may obtain the initial position of the camera C by matching the second landmark other than the traffic lane existing on the second region of interest onto the image based on the initial attitude angle of the camera C. Specifically, the landmark position estimating apparatus 100 or 200 may obtain the translation matrix T for the initial position of the camera C by inputting the previously obtained rotation matrix R for the initial attitude angle of the camera C into Equation 1 to calculate.

At this time, the translation matrix T for initial positions of a plurality of the cameras C corresponding to the rotation matrix R for the initial attitude angle of the single camera C may be obtained.

The initial position information including the obtained initial position and the initial attitude angle of the camera C may be used as an input value for estimating position information of the camera C, which will be described.

Compared to a case of estimating the position information of the camera C by simply using the initial position information of the vehicle V as the initial position information of the camera C, it is possible to improve accuracy and processing speed of estimating the position information of the camera C because the more accurate initial position information of the camera C is used as an input value if the above-described method is followed.

Figure 9:
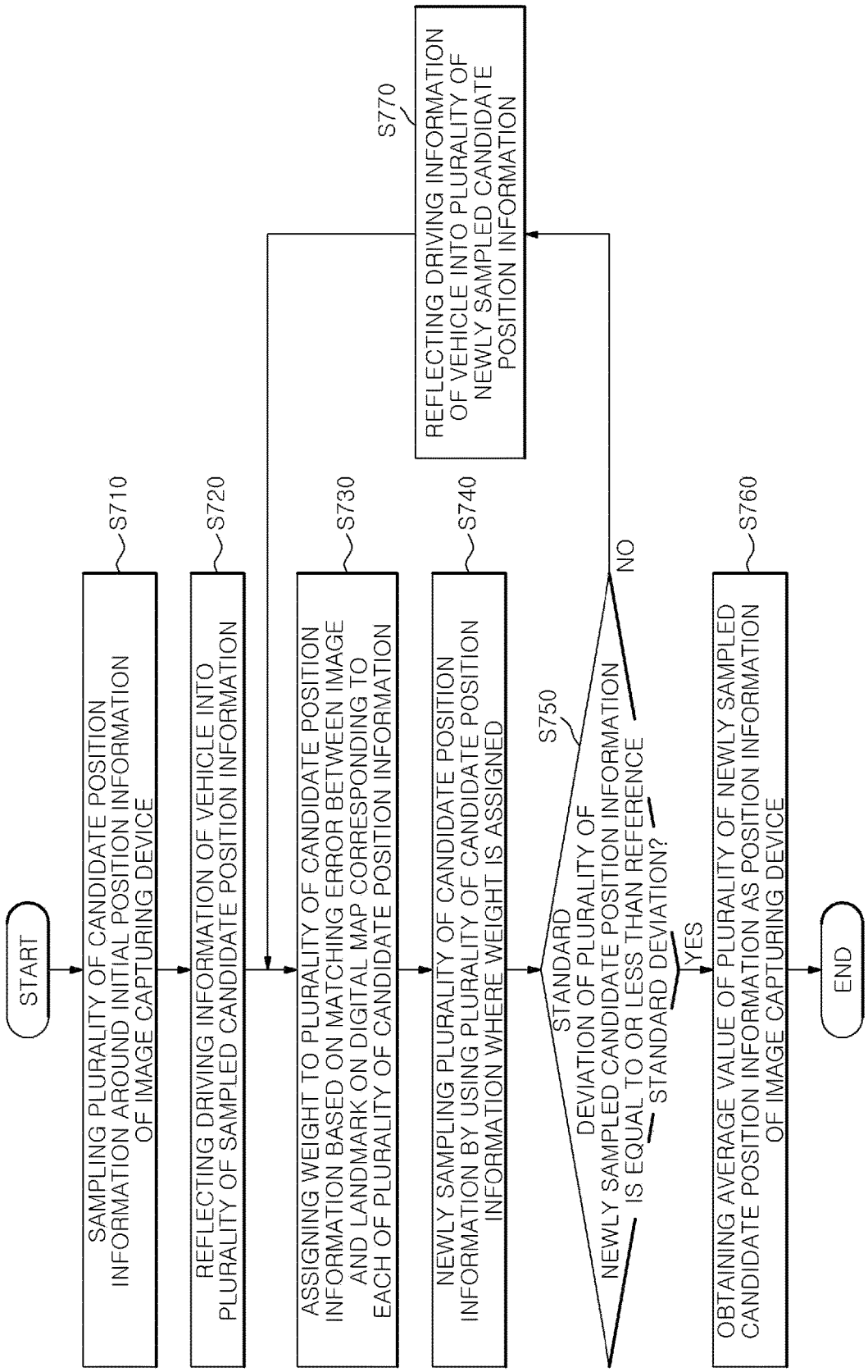
FIG. 9 shows a flowchart illustrating a method of obtaining position information of an image capturing device based on initial position information of the image capturing device according to an embodiment of the present disclosure.

After the initial position information of the camera C is obtained, the landmark position estimating apparatus 100 or 200 may estimate the position information of the camera C by using the initial position of the camera C as the input value. FIG. 9 shows a flowchart illustrating a method of obtaining the position information of the camera C based on the initial position information of the camera C according to an embodiment. Hereinafter, the method of estimating the position information of the camera C will be described in detail with reference to FIG. 9.

Referring to FIG. 9, in a step S710, the landmark position estimating apparatus 100 or 200 may perform sampling for a plurality of candidate position information around initial position information of the camera C. Specifically, the landmark position estimating apparatus 100 or 200 may set the initial position information of the camera C as an average to perform sampling by using a Gaussian probability model in which error modeling is set with predetermined covariance. At this time, the Gaussian probability model may be defined as a minimum of six dimensions having three degrees of freedom for an attitude angle and three degrees of freedom for a position.

If there is a plurality of the initial position information of the cameras C, the landmark position estimating apparatus 100 or 200 may perform sampling for each initial position information of the cameras C according to the Gaussian probability model.

Then, the landmark position estimating apparatus 100 or 200 may obtain estimation position information of the camera C by using a Particle Filter. Specifically, in a step S720, the landmark position estimating apparatus 100 or 200 may reflect driving information on the vehicle V into a plurality of the candidate position information. At this time, the landmark position estimating apparatus 100 or 200 may follow Equation 3.

$$\begin{bmatrix} \hat{x}(k+1) \\ \hat{y}(k+1) \\ \hat{\theta}(k+1) \end{bmatrix} = \begin{bmatrix} \hat{x}(k) \\ \hat{y}(k) \\ \hat{\theta}(k) \end{bmatrix} + \begin{bmatrix} \frac{S_r+S_l}{2}\cos\left(\theta+\frac{S_r-S_l}{2b}\right) \\ \frac{S_r+S_l}{2}\sin\left(\theta+\frac{S_r-S_l}{2b}\right) \\ \frac{S_r-S_l}{b} \end{bmatrix} \qquad \text{[Equation 3]}$$

Herein, a matrix $[x(k); y(k); \theta(k)]$ may indicate a position and a driving direction of the vehicle V at a time k. $S_r$ may indicate a driving distance according to a right wheel speed of the vehicle V. $S_l$ may indicate a driving distance according to a left wheel speed of the vehicle V.

To this end, landmark position estimating apparatus 100 or 200 may receive driving information including wheel speed information and yaw rate information from the vehicle V.

Thereafter, in a step S730, the landmark position estimating apparatus 100 or 200 may weight each of a plurality of the candidate position information based on a matching error between the image and a landmark on the digital map corresponding to each of a plurality of the candidate position information.

To this end, the landmark position estimating apparatus 100 or 200 may use the image in which the landmark is extracted. At this time, as a result of reflection of the driving information, candidate position information off the road or candidate position information of an opposite road to the driving direction of the vehicle V may be excluded.

When the first type landmark and the second landmark are extracted from the image, the landmark position estimating apparatus 100 or 200 may match the landmark on the digital map corresponding to each of a plurality of the candidate position information onto the image. Further, if the matching error is identified, the landmark position estimating apparatus 100 or 200 may obtain a weight corresponding to the matching error. This may follow Equation 4.

$$G_\sigma(\Delta x, \Delta y) = \frac{1}{2\pi\sigma^2} e^{-\left(\frac{\Delta x^2 + \Delta y^2}{2\sigma^2}\right)} \quad \text{[Equation 4]}$$

Herein, $G_\sigma$ may indicate the weight. ($\Delta x$, $\Delta y$) may indicate an error for x and y in the image. $\sigma$ may indicate a standard deviation.

Then, the landmark position estimating apparatus 100 or 200 may reflect the matching error by assigning the corresponding weight to the candidate position information.

After assigning the weight, in a step S740, the landmark position estimating apparatus 100 or 200 may newly perform sampling for a plurality of the candidate position information by using a plurality of the candidate position information where the weight is assigned. Since the sampling is newly performed based on the result of assigning the weight, a plurality of the candidate position information may converge around candidate position information having a small matching error.

When the sampling is completed, in a step S750, the landmark position estimating apparatus 100 or 200 may identify whether the standard deviation of a plurality of the candidate position information where the sampling is newly performed is equal to or less than a reference standard deviation. Herein, the reference standard deviation may indicate a maximum standard deviation capable of obtaining the estimation position information of the camera C by using a plurality of candidate positions.

If the standard deviation of a plurality of the candidate position information newly sampled is equal to or less than the reference standard deviation, in a step S760, the landmark position estimating apparatus 100 or 200 may obtain an average value of a plurality of the newly sampled candidate position information as the estimation position information of the camera C.

On the other hand, if the standard deviation of a plurality of the newly sampled candidate position information is greater than the reference standard deviation, in a step S770, the landmark position estimating apparatus 100 or 200 may reflect the driving information of the vehicle V into a plurality of the newly sampled candidate position information, and then the step S770 may proceed to the step S730 again.

Heretofore, with reference to FIGS. 6 to 9, the process in which the landmark position estimating apparatus 100 or 200 determines the position of the image capturing device 10 has been described. The above-described process of determining the position of the image capturing device 10 may be supported by Korean Patent Application No. 10-2018-0059626 and PCT International Application No. PCT/KR2018/013252 previously filed by the present applicant.

Referring back to FIG. 5, the landmark position estimating apparatus 100 or 200 determines the positions of the image capturing device 10 where a plurality of images are captured through the step S510, and then, in a step S520, measures the three-dimensional position of the first type landmark based on the positions of the image capturing device 10 determined in the step S510 and a plurality of the images.

Figure 10:
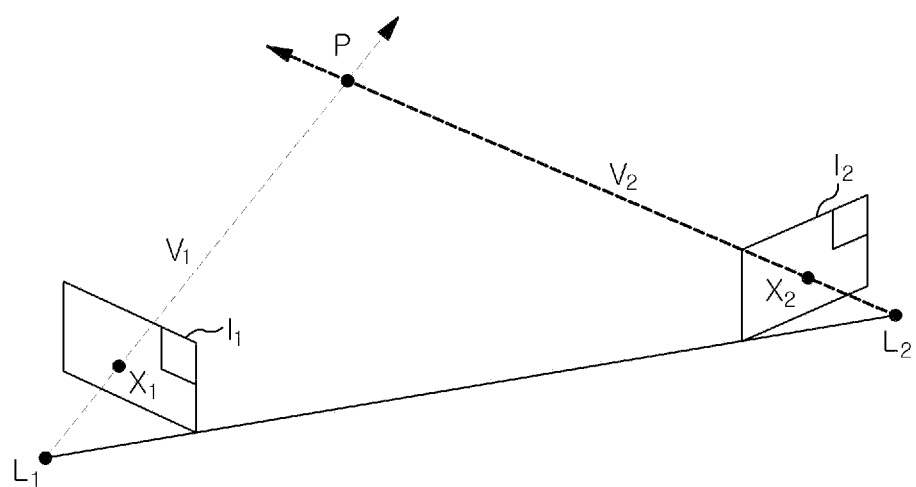
FIG. 10 shows a diagram illustrating a method of estimating a three-dimensional position of a first type landmark by using two images according to an embodiment of the present disclosure.
Figure 11:
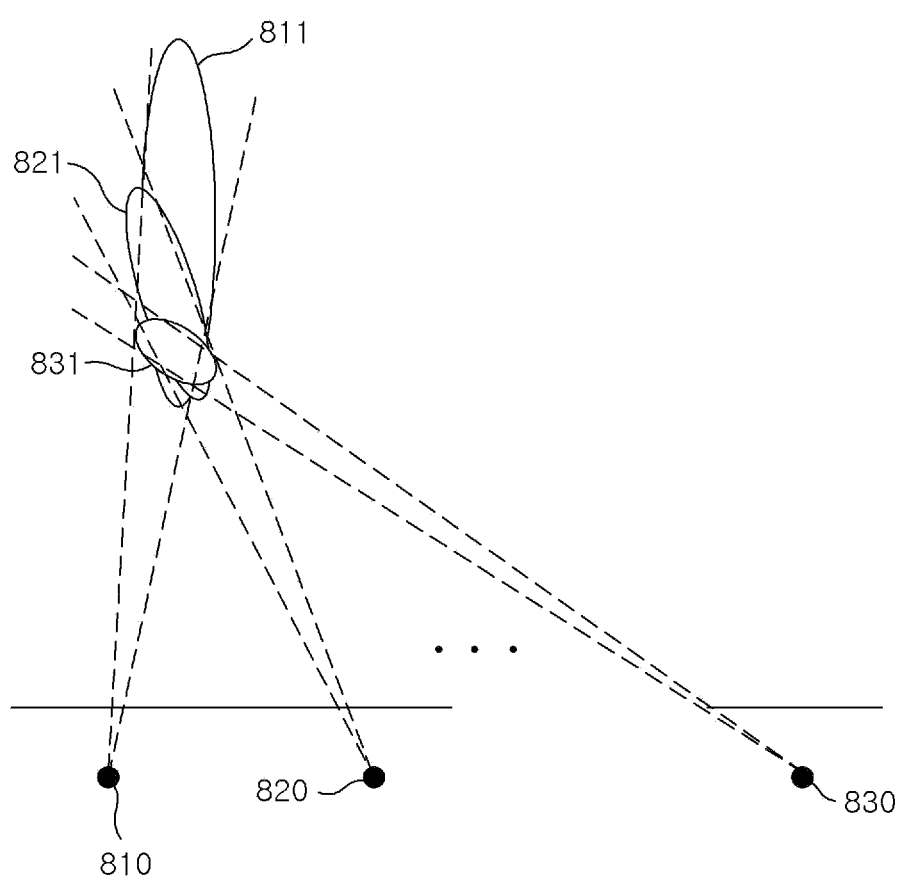
FIG. 11 shows a diagram illustrating accuracy of an estimated three-dimensional position of a first type landmark according to an embodiment of the present disclosure.

FIG. 10 shows a diagram illustrating a method of estimating a three-dimensional position of a first type landmark by using two images according to one embodiment of the present disclosure, and FIG. 11 shows a diagram illustrating accuracy of the estimated three-dimensional position of the first type landmark according to an embodiment of the present disclosure.

Referring to FIG. 10, the landmark position estimating apparatus 100 or 200 obtains a first vector $V_1$ passing a pixel $X_1$ corresponding to the first type landmark on a first image $I_1$ from a first position $L_1$ where the first image $I_1$ is captured. Further, the landmark position estimating apparatus 100 or 200 obtains a second vector $V_2$ passing a pixel $X_2$ corresponding to the first type landmark on a second image $I_2$ from a second position $L_2$ where the second image $I_2$ is captured. Then, the landmark position estimating apparatus 100 or 200 measures an intersection of the first vector $V_1$ and the second $V_2$ as a three-dimensional position P of the first type landmark. In this case, as a distance between the first position $L_1$ and the second position $L_2$ increases, the three-dimensional position P of the first type landmark may be accurately measured. Therefore, the landmark position estimating apparatus 100 or 200 may select and use the first position $L_1$ and the second position $L_2$ which are separated from each other by a distance longer than a predetermined threshold distance. This is because, as the distance between capturing positions increases, a pixel error of the first type landmark recognized on real images decreases and thus the error of the three-dimensional positions of the first type landmark determined based thereon also decreases. For example, if an error of the positions of the first type landmark in two real images captured at two positions separated by one meter is one pixel, and an error of the positions of the first type landmark in two real images captured at two positions separated by two meters is one pixel, the latter case has higher accuracy than the former case for the three-dimensional position P of the first type landmark determined based on each of the cases.

Referring back to FIG. 5, the landmark position estimating apparatus 100 or 200 may use at least two images to estimate the three-dimensional position of the first type landmark. However, the landmark position estimating apparatus 100 or 200 may use a larger number of images to estimate the three-dimensional position of the first type landmark, thereby reducing a measurement error. In other words, in a step S530, while changing the images, the previously measured three-dimensional position of the first type landmark may be corrected through the process described with reference to FIG. 10.

Referring to FIG. 11, real images may be captured at a plurality of positions 810, 820, and 830 respectively, and it may be identified that an error range 811 of the position of the first type landmark estimated from the real image captured at the first position 810 is relatively large. However, it may be identified that an error range 821 of the position of the first type landmark that is estimated at the second position 820 by considering the estimated result at the first position 810 is smaller than the error range 811. Further, it may be identified that an error range 831 of the first landmark position that is estimated at the third position 830 by considering the estimated result at the second position 820 is smaller than the error range 821.

On the other hand, the landmark position estimating apparatus 100 or 200 may use Equations 5 to 8 to estimate the three-dimensional position of the first type landmark from a plurality of images.

$$d = \lambda K^{-1} R^{-1} (u,v,1)^T \quad \text{[Equation 5]}$$

Herein, d indicates a three-dimensional direction vector from a lens of the image capturing device 10 to the position of the first type landmark. $\lambda$ indicates a constant for normalization that makes $d=(a, b, c)^T$ into a unit vector. In addition, R is a three-dimensional rotation matrix representing an attitude angle or an orientation angle of the image capturing device 10. Further, K indicates a calibration matrix related to an intrinsic parameter of the image capturing device 10 assuming a pin-hole model.

In addition, the landmark position estimating apparatus 100 or 200 may use Equations 6 to 8 as follows to obtain the three-dimensional position P* of the first type landmark.

$$P^* = A^{-1} b \quad \text{[Equation 6]}$$

$$A = \begin{pmatrix} \sum_i^n (1-a_i^2) & -\sum_i^n a_i b_i & -\sum_i^n a_i c_i \\ -\sum_i^n a_i b_i & \sum_i^n (1-b_i^2) & -\sum_i^n b_i c_i \\ -\sum_i^n a_i c_i & -\sum_i^n b_i c_i & \sum_i^n (1-c_i^2) \end{pmatrix} \quad \text{[Equation 7]}$$

$$b = \begin{pmatrix} \sum_i^n [(1-a_i^2)x_i - a_i b_i y_i - a_i c_i z_i] \\ \sum_i^n [-a_i b_i x_i + (1-b_i^2)y_i - b_i c_i z_i] \\ \sum_i^n [-a_i c_i x_i - b_i c_i x_i + (1-c_i^2)z_i] \end{pmatrix} \quad \text{[Equation 8]}$$

Herein, $(x_i, y_i, z_i)$ indicates an i-th position among a plurality of positions of the image capturing device 10.

The three-dimensional position P of the first type landmark estimated based on Equation 6 indicates coordinates expressed based on a first capturing position (i=1), and covariance is $A^{-1}$, which represents an error of the three-dimensional position P of the first type landmark expressed based on the first capturing position (i=1).

On the other hand, if a three-dimensional transformation matrix T is applied to the three-dimensional position P of the first type landmark based on a camera coordinate system of the image capturing device 10, three-dimensional coordinates $P_L$ of the first type landmark based on a coordinate system of a digital map may be obtained. At this time, since the transformation matrix T has an error according to the position and the attitude angle or the orientation angle of the image capturing device 10, covariance $C_{PL}$ of the $P_L$ to which a concept of error propagation is applied may be obtained. The covariance $C_{PL}$ of $P_L$ may be obtained according to Equation 9.

$$C_{PL} = J_1 \times A^{-1} \times J_1^T + J_2 \times C_T \times J_2^T \quad \text{[Equation 9]}$$

Herein, $J_1$ indicates a partial derivative of a function T×P (a Jacobian matrix) for the three-dimensional position P. $C_T$ indicates covariance of the three-dimensional transformation matrix T. Further, $J_2$ indicates a partial derivative of the function T×P (a Jacobian matrix) for the three-dimensional transformation matrix T.

Referring back to FIG. 3, in a step S330, the landmark position estimating apparatus 100 or 200 estimates the position of the second type landmark identified in the step S310 on a virtual plane including the three-dimensional position of the first type landmark estimated in the step S320.

Figure 12:
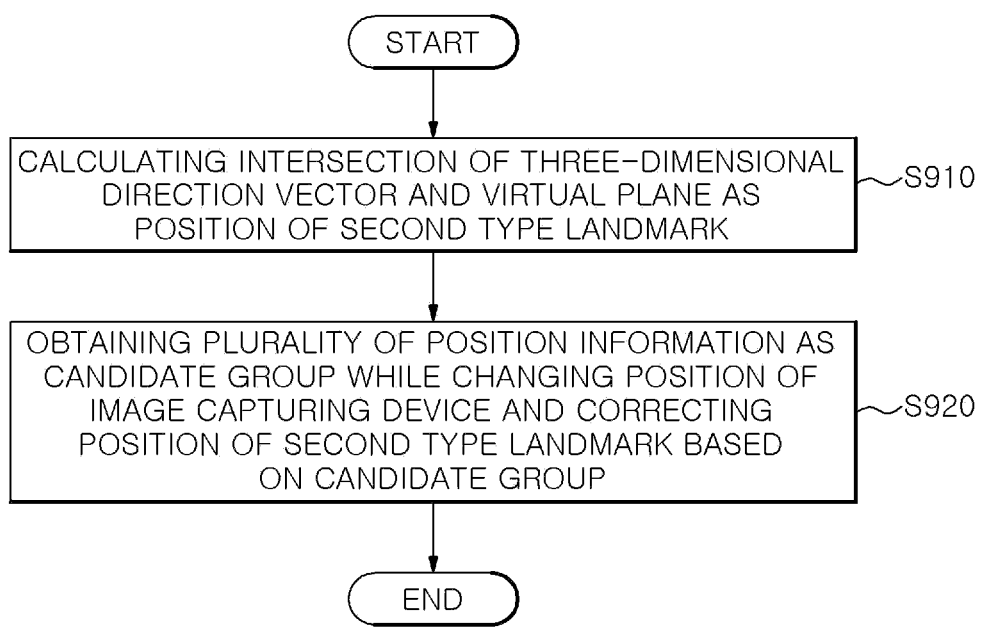
FIG. 12 shows a flowchart illustrating a method of estimating a position of a second type landmark according to an embodiment of the present disclosure.

FIG. 12 illustrates a detailed process of estimating the position of the second type landmark described in the step S330 by the landmark position estimating apparatus 100 or 200 according to an embodiment.

Referring to FIG. 12, in a step S910, the landmark position estimating apparatus 100 or 200 may calculate, as a position of the second type landmark, an intersection of a three-dimensional direction vector passing coordinates identified as the second type landmark on an image from an origin of a camera coordinate system of the image capturing device 10 and a virtual plane including a three-dimensional position of a first type landmark.

Figure 13:
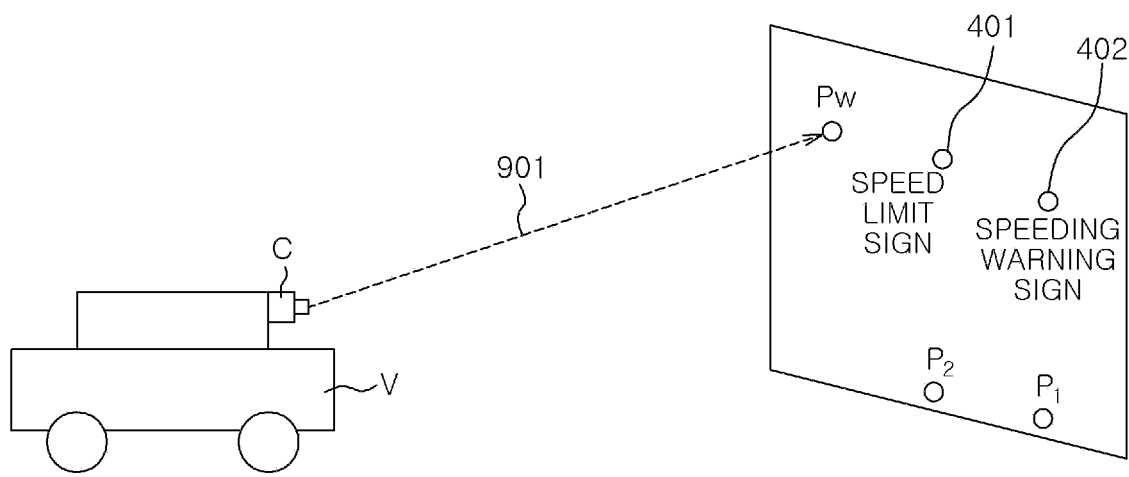
FIG. 13 shows a diagram illustrating a principle of estimating a three-dimensional position of a second type landmark according to an embodiment of the present disclosure.

As shown in FIG. 13, the landmark position estimating apparatus 100 or 200 generates, as the virtual plane, a plane perpendicular to a driving route that includes coordinates of each three-dimensional position of the traffic sign 401 including a number such as a speed limit, and the traffic sign 402 including a letter such as a speeding warning sign. In addition, the landmark position estimating apparatus 100 or 200 may calculate, as the position of the second type landmark, an intersection $P_W$ of a three-dimensional direction vector 901 passing the coordinates identified as the second type landmark on the image from an origin of the camera coordinates system of the image capturing device 10, that is the camera C, and the virtual plane including the three-dimensional position of the first type landmark.

For example, the landmark position estimating apparatus 100 or 200 may use Equations 10 and 11 to calculate the position of the second type landmark.

The landmark position estimating apparatus 100 or 200 obtains a solution of Equation 10 in order to generate the virtual plane, perpendicular to the driving route, including the coordinates of the three-dimensional position of the first type landmark.

$$ax + by + cz + d = 0 \quad \text{[Equation 10]}$$

Herein, a, b, c, and d are coefficients of a plane equation, and may be obtained by solving simultaneous equations such as a form of AX=B by using at least four points. An equation of the virtual plane is obtained by using coordinates $(x_1,y_1,z_1)$ and $(x_2,y_2,z_2)$ of three-dimensional positions of the traffic signs 401 and 402 and coordinates $(x_1,y_1,z_1$-offset) and $(x_2,y_2,z_2$-offset) of three-dimensional positions of two virtual points $P_1$ and $P_2$ that is generated by subtracting an offset value from each of z coordinates of the three-dimensional positions of the traffic signs 401 and 402.

Figure 14:
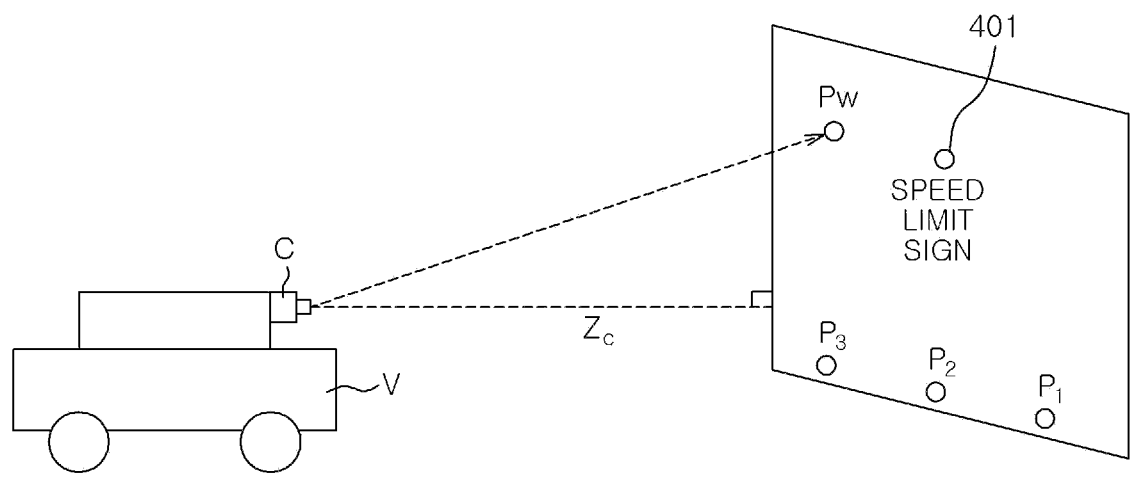
FIG. 14 shows a diagram illustrating a principle of estimating a three-dimensional position of a second type landmark according to an embodiment of the present disclosure.

In addition, when the landmark position estimating apparatus 100 or 200 generates, as the virtual plane, the plane perpendicular to the driving route that includes coordinates of the three-dimensional positions of the traffic sign 401 including the number such as the speed limit and the traffic sign 402 including the letter such as the speeding warning sign, the landmark position estimating apparatus 100 or 200 may generate the virtual plane by using a single traffic sign among the traffic sings 401 and 402. In other words, even if there is any one of the traffic sign 401 including the numbers and the traffic sign 402 including the letter exists, the virtual plane perpendicular to the driving route may be generated. FIG. 14 shows a diagram illustrating a process of generating the virtual plane in a case where a single first type landmark, such as the traffic sign 401 including the number exists.

Referring to FIG. 14, the landmark position estimating apparatus 100 or 200 transforms a previously obtained three-dimensional position of the traffic sign 401 from an absolute coordinate system into a camera coordinate system by using a posture including an attitude angle and a position of the camera C in the absolute coordinate system. If a posture including an attitude angle and a position of the vehicle V in the absolute coordinate system is obtained, a three-dimensional position in the camera coordinate system may be calculated by using Equations 11 to 13 assuming that a virtual camera is positioned on an origin of a vehicle coordinate system and a direction (or the z-axis $Z_c$) where the camera C faces is the same as a longitudinal direction (or a driving direction) of the vehicle V.

$$P_w = R \times P_c + T, P_c = R^{-1} \times (P_w - T) \quad \text{[Equation 11]}$$

Herein, $P_w$ indicates a three-dimensional position of the traffic sign 401 in the absolute coordinate system. R and T indicate, respectively, a rotation matrix and a movement matrix representing the posture of the camera in the absolute coordinate system. $P_c$ indicates a three-dimensional position in which $P_w$ is expressed in the camera coordinate system.

$$u = f \times \frac{X_c}{Z_c} + u0, \quad v = f \times \frac{Y_c}{Z_c} + v0 \quad \text{[Equation 12]}$$

Herein, when $P_C$ obtained in Equation 11 is $[X_c, Y_c, Z_c]$, u and v indicate coordinates of pixels on the image expressed in the camera coordinate system, u0 and v0 indicate Principal Points of the camera C, and f indicates a focal length obtained in advance through camera calibration.

Equation 13 may be obtained from Equation 12. In addition, $Z_c$ obtained in Equation 11 indicates a vertical distance from the origin of the camera coordinate system to the virtual plane as shown in FIG. 14.

$$X_c, \text{new} = (u_{new} - u0) \times \frac{Z_c}{f}, \quad \text{[Equation 13]}$$
$$Y_c, \text{new} = (v_{new} - u0) \times \frac{Z_c}{f}$$

Herein, if $Z_C$ obtained in Equation 11 is used in Equation 13, and if $u_{new}$ and $v_{new}$ are designated as arbitrary coordinates in the camera coordinate system, a position corresponding to an arbitrary point shown in FIG. 14 may be obtained, thereby obtaining positions corresponding to three arbitrary points $P_1$, $P_2$, and $P_3$. If the positions corresponding to three arbitrary points $P_1$, $P_2$, and $P_3$ are obtained by using Equation as described above, positions of total four points including the position of the traffic sign 401 are determined. If the positions of the four points are determined, an equation of the plane perpendicular to the driving direction of the vehicle V may be obtained as described with reference to FIG. 13.

In addition, the landmark position estimating apparatus 100 or 200 calculates the intersection $P_w$ of the virtual plane and a three-dimensional direction vector $P_{ray}$ passing coordinates or a pixel identified as the second type landmark on the image from the origin of the camera coordinate system of the image capturing device 10, that is the camera C.

$$P_{ray} = R^{-1}(K^{-1}m - T) \quad \text{[Equation 14]}$$

Herein, $P_{ray} = [x,y,z]^T$ indicates the three-dimensional direction vector 901 shown in FIG. 13. R and T respectively indicate the rotation matrix and the translation matrix for transforming the three-dimensional point $P_w$ into the camera coordinate system. m indicates coordinates corresponding to the image. K indicates a 3×3 matrix related to an intrinsic parameter of the camera C.

Referring back to FIG. 12, in a step S920, the landmark position estimating apparatus 100 or 200 may obtain, as a candidate group, position information regarding the positions of the second type landmark calculated for one first type landmark while changing a position of the image capturing device 10 and may correct the position of the second type landmark calculated in the step S910 based on the obtained candidate group.

Figure 15:
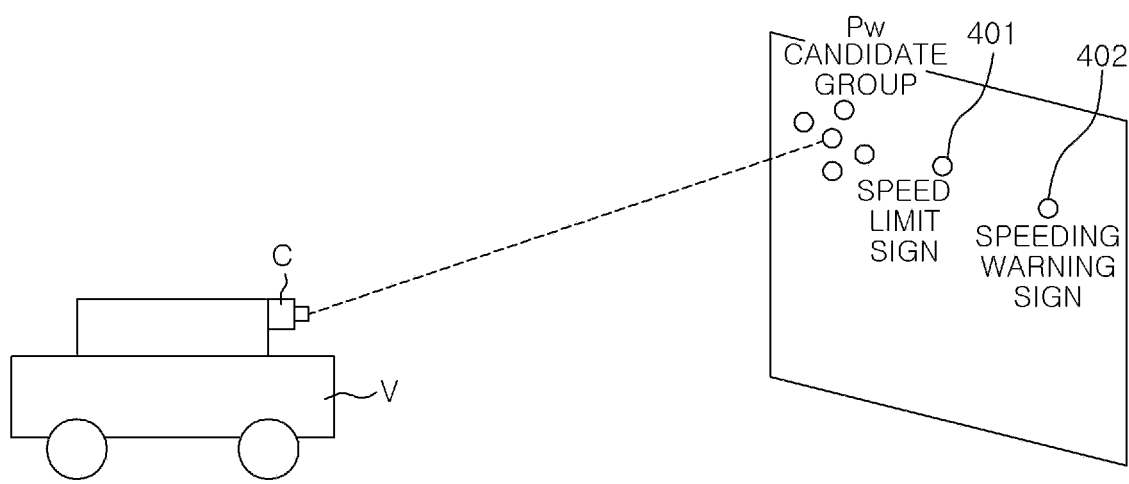
FIG. 15 shows a diagram illustrating a principle of estimating a three-dimensional position of a second type landmark according to an embodiment of the present disclosure.

FIG. 15 shows candidate groups (or a $P_w$ candidate group) in which three-dimensional positions of one second type landmark are estimated while the image capturing device 10, that is, the camera C moves. For example, the landmark position estimating apparatus 100 or 200 may select an average value of the $P_w$ candidate group or a three-dimensional position of the second type landmark corresponding to a position having the shortest recognized distance as a final position of the second type landmark. As the recognized distance decreases, a recognition error decreases, if an error of the same pixel occurs for each distance between the image capturing device 10 and the second type landmark, accuracy of a three-dimensional position is greatest when the distance between the image capturing device 10 and the second type landmark is closest.

Figure 16:
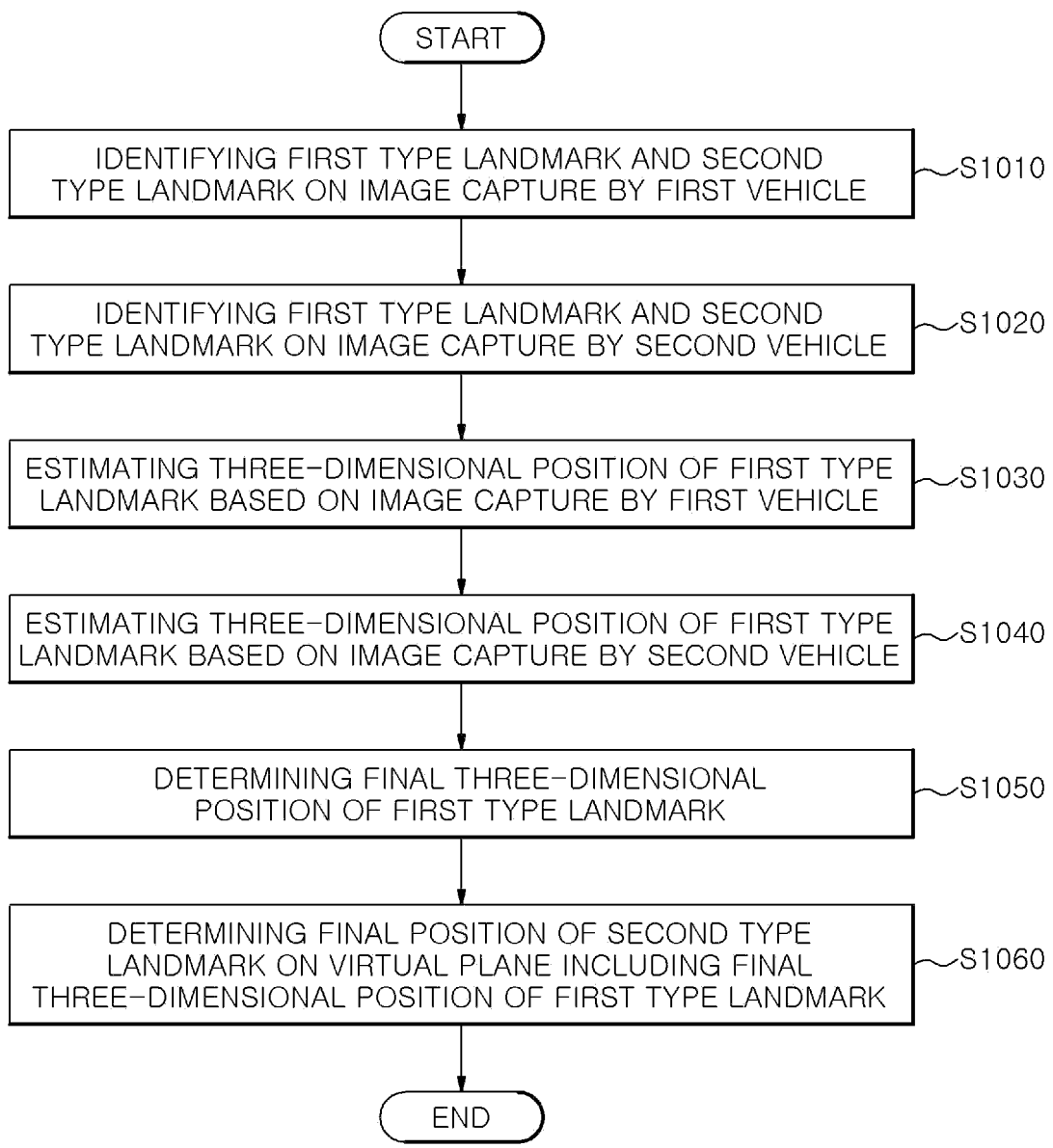
FIG. 16 shows a flowchart illustrating a landmark position estimating method according to another embodiment of the present disclosure.

FIG. 16 shows a flowchart illustrating a landmark position estimating method performed by the landmark position estimating apparatus 200 according to another embodiment of the present disclosure.

First, in a step S1010, the landmark position estimating apparatus 200 identifies each of a first type landmark and a second type landmark on an image, captured by the image capturing device 10 of a first vehicle among N number of the vehicles V, including various landmarks on a driving route. In addition, in a step S1020, the landmark position estimating apparatus 200 identifies each of the first type landmark and the second type landmark on an image, captured by the image capturing device 10 of a second vehicle among a plurality of the vehicles, including various landmarks on a driving route. In this way, a process of identifying each of the first type landmark and the second type landmark is performed for each of images captured by the image capturing devices 10 mounted on the N number of the vehicles V.

Further, in a step S1030, the landmark position estimating apparatus 200 estimates a three-dimensional position of the first type landmark based on the image captured by the image capturing device 10 of the first vehicle among the plurality of the vehicles V. Thereafter, in a step S1040, the landmark position estimating apparatus 200 estimates the three-dimensional position of the first type landmark based on the image captured by the image capturing device 10 of the second vehicle among the plurality of the vehicles V. As described above, the process of estimating the three-dimensional position of the first type landmark is performed based on each of images captured by the image capturing devices 10 mounted on the N number of the vehicles V.

Thereafter, in a step S1050, the landmark position estimating apparatus 200 collects the three-dimensional positions of the first type landmark estimated over several times as a candidate group, and determines a final three-dimensional position of the first type landmark based on the collected candidate group. For example, the landmark position estimating apparatus 200 may determine an average value of the three-dimensional positions of the first type landmark estimated over several times as the final three-dimensional position of the first type landmark. For example, since a three-dimensional position of the traffic sign 401 including the number and the traffic sign 402 including the letter such as the speeding warning sign may be expressed as an average and covariance, the final position may be updated by using a Kalman filter. In this case, when a size of updated covariance is less than or equal to a threshold value and the number of estimated three-dimensional positions is greater than or equal to a threshold value, it may be determined that the three-dimensional position of the first type landmark is stably estimated. Since a result of image analysis for the traffic sign 401 including the number on the image provides not only the position but also speed limit information, the final three-dimensional position may be estimated by clustering traffic signs 401 determined to have the same speed limit. Similarly, the traffic signs 402 including the letter recognized on the image may also be identified, based on a recognized phrase, whether for a general speed camera or point-to-point speed enforcement, so the final three-dimensional position may be estimated by clustering traffic signs 402 having the same warning phrases are clustered.

Thereafter, in a step S1060, the landmark position estimating apparatus 200 generates a virtual plane perpendicular to the driving route that includes the final three-dimensional position of the first type landmark determined in the step S1050, and determines a final position of the second type landmark on the generated virtual plane.

Figure 17:
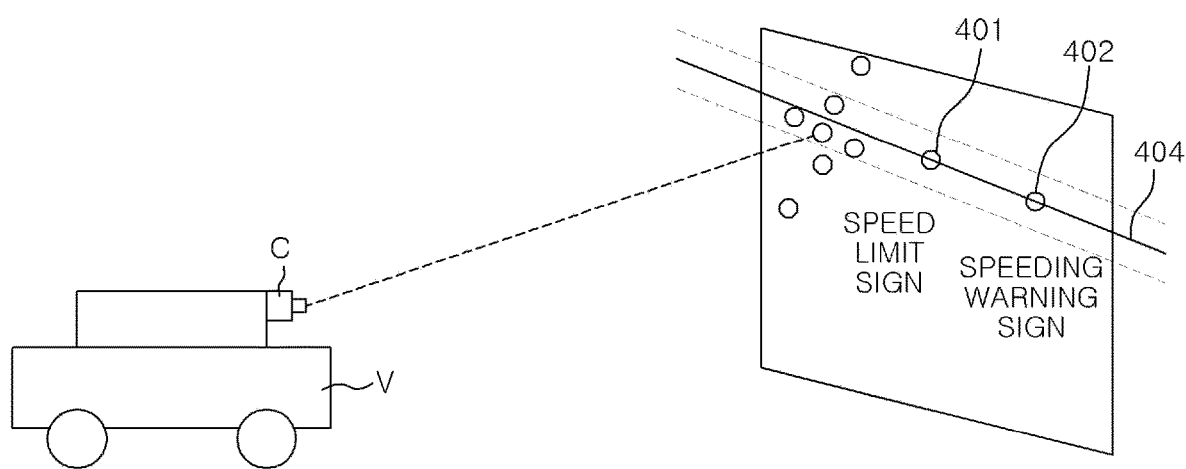
FIG. 17 shows a diagram illustrating a principle of estimating a three-dimensional position of a second type landmark by a landmark position estimating method according to another embodiment of the present disclosure.

For example, when determining the final position of the second type landmark, the landmark position estimating apparatus 200 may determine the final position of the second type landmark based on intersections among the candidate group including three-dimensional positions estimated for the second type landmark within a predetermined distance from a virtual line 404 passing the traffic sign 401 including the number and the traffic sign 402 including the letter such as the speeding warning sign as shown in FIG. 17. Accordingly, reliability of the determined final position of the second type landmark may be improved. Without the above method, a security camera, other than the speed camera, among the second type landmarks may be recognized in the image or misrecognition of the speed camera may be included in a result. In addition, since it is difficult to distinguish between the speed camera and the security camera in the image, when a camera is recognized in the image, a condition under which the traffic sign 401 including the number or the traffic sign 402 including the letter such as the speeding warning sign is further recognized may be used, thereby removing a significant amount of noise.

In addition, the landmark position estimating apparatus 200 calculates an average value and a standard deviation of the intersections if the number of intersections obtained among the candidate group including the estimated three-dimensional positions of the second type landmark is equal to or greater than a predetermined threshold number. Thereafter, if the calculated standard deviation is less than or equal to a predetermined threshold deviation, the landmark position estimating apparatus 200 may determine the average value as the final position of the second type landmark.

According to an embodiment of the present disclosure described heretofore, a three-dimensional position of a landmark having relatively high image identification among various landmarks included on an image captured while driving the vehicle is estimated in advance, and then, a position of a landmark with relatively low image identification is estimated based on the estimated three-dimensional position. For example, when estimating a position of the speed camera among landmarks on the driving route, a three-dimensional position of the traffic sign such as the speed limit sign including a number or the speeding warning sign including a letter installed on the same structure on which the speed camera is mounted may be estimated in advance. Thereafter, the position of the speed camera may be estimated based on the three-dimensional position of the traffic sign.

Accordingly, the position information of the landmark having relatively low image identification may be quickly estimated, and reliability of the estimated position information may be improved as much as that of the landmark having relatively high image identification.

Each flowcharts of the present disclosure can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the steps of the flowchart. These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts. The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each step in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to an embodiment, the vehicle navigation equipment may be used for the purpose of keeping the information on a position of the speed limit enforcement on the driving route of the vehicle in an up-to-date state. In addition, it may be applied and used in a technical field in which an object with relatively low image identification and an object with relatively high image identification are identified simultaneously.

What is claimed is:

1. A landmark position estimating method performed by a landmark position estimating apparatus, the method comprising:
    identifying a first type landmark and a second type landmark from an image, captured by an image capturing device of a vehicle, including various landmarks on a driving route;
    estimating a three-dimensional position of the identified first type landmark based on a plurality of images on which the first type landmark is identified and a digital map including a driving area of the vehicle; and
    estimating a position of the identified second type landmark on a virtual plane including the three-dimensional position of the first type landmark.

2. The method of claim 1, wherein the first type landmark is a landmark including a letter or a number, and the second type landmark is a landmark not including any letter or any number.

3. The method of claim 1, wherein the plurality of the images include a first image including the first type landmark captured at a first position and a second image including the first type landmark captured at a second position, and
    the estimating the three-dimensional position of the first type landmark includes measuring, as the three-dimensional position of the first type landmark, an intersection of a first vector passing a pixel corresponding to the first type landmark on the first image from the first position and a second vector passing a pixel corresponding to the first type landmark on the second image.

4. The method of claim 3, wherein a distance between the first position and the second position is longer than a predetermined threshold distance.

5. The method of claim 3, wherein the estimating the three-dimensional position of the first type landmark further includes determining the first position and the second position respectively by estimating a position of the image capturing device based on position information of the vehicle and the digital map.

6. The method of claim 5, wherein the determining the first position and the second position includes:
    obtaining initial position information of the image capturing device by matching a landmark indicator on the digital map corresponding to initial position information of the vehicle onto the image captured by the image capturing device; and
    determining the first position and the second position based on the position of the image capturing device calculated based on a matching error between the image and the landmark indicator on the digital map corresponding to each of a plurality of candidate position information performed sampling based on the initial position information of the image capturing device and driving information of the vehicle.

7. The method of claim 1, wherein the virtual plane is a plane that includes coordinates of the three-dimensional position of the first type landmark and is perpendicular to the driving route.

8. The method of claim 1, wherein the estimating the position of the second type landmark includes calculating, as the position of the second type landmark, an intersection of the virtual plane and a three-dimensional vector passing coordinates identified as the second type landmark on the image from an origin of a coordinate system for the image capturing device.

9. The method of claim 8, wherein the estimating the position of the second type landmark further includes:
    obtaining, as a candidate group, a plurality of position information on the position of the second type landmark calculated for the single first type landmark while changing the position of the image capturing device; and
    correcting the calculated position of the second type landmark based on the candidate group.

10. The method of claim 8, wherein the virtual plane is determined by:
    calculating a three-dimensional position, in the coordinate system for the image capturing device, of the first type landmark from a three-dimensional position, in an absolute coordinate system, of the first type landmark through coordinate system conversion using a posture of the image capturing device;
    determining positions corresponding to three points or more positioned on the virtual plane based on a three-dimensional position in the coordinate system for the image capturing device and calibration information of the image capturing device; and
    solving an equation of the virtual plane based on the positions of the first type landmark and the three points or more.

11. The method of claim 1, further comprising:
    identifying the first type landmark and the second type landmark on the image, captured by another image capturing device of another vehicle, including various landmarks on the driving route;
    estimating a three-dimensional position of the first type landmark identified on the image captured by the other image capturing device of the another vehicle based on a plurality of images, captured by the other image capturing device of another vehicle, on which the first type landmark is identified and a digital map including a driving area of the other vehicle; and
    determining a final three-dimensional position of the first type landmark based on the three-dimensional position of the first type landmark estimated based on the image captured by the image capturing device of the vehicle and the three-dimensional position of the first type landmark estimated based on the image captured by the image capturing device of the other vehicle,
    wherein the estimating the position of the second landmark includes:

obtaining, as a candidate group, intersections of three-dimensional direction vectors passing coordinates identified as the second type landmark on each image captured by each image capturing device mounted on the vehicle and the other vehicle from an origin of each coordinate system for the each image capturing device and a virtual plane including the final three-dimensional position of the first type landmark; and determining a final position of the second type landmark based on the candidate group.

12. The method of claim 11, wherein the first type landmark includes a first traffic sign and a second traffic sign mounted on a single structure on the driving route, and the determining the final position of the second type landmark is performed based on intersections, among the candidate group, within a predetermined distance from a virtual line passing the first traffic sign and the second traffic sign.

13. A non-transitory computer-readable storage medium including computer executable instructions, wherein the instructions, when executed by a processor, cause the processor to perform a handover management method, the method comprising:

identifying a first type landmark and a second type landmark from an image, captured by an image capturing device of a vehicle, including various landmarks on a driving route;

estimating a three-dimensional position of the identified first type landmark based on a plurality of images on which the first type landmark is identified and a digital map including a driving area of the vehicle; and estimating a position of the identified second type landmark on a virtual plane including the three-dimensional position of the first type landmark.

14. A landmark position estimating apparatus comprising:

an image processing unit configured to identify a first type landmark and a second type landmark from an image, captured by an image capturing device of a vehicle, including various landmarks on a driving route;

a storage unit configured to store a digital map including a driving area of the vehicle; and a control unit configured to estimate a three-dimensional position of the identified first type landmark based on a plurality of images on which the first type landmark is identified and the digital map, and to estimate a position of the identified second type landmark on a virtual plane including the three-dimensional position of the first type landmark.

15. The non-transitory computer-readable storage medium of claim 13, wherein the first type landmark is a landmark including a letter or a number, and the second type landmark is a landmark not including any letter or any number.

16. The non-transitory computer-readable storage medium of claim 13, wherein the plurality of the images include a first image including the first type landmark captured at a first position and a second image including the first type landmark captured at a second position, and the estimating the three-dimensional position of the first type landmark includes measuring, as the three-dimensional position of the first type landmark, an intersection of a first vector passing a pixel corresponding to the first type landmark on the first image from the first position and a second vector passing a pixel corresponding to the first type landmark on the second image.

17. The non-transitory computer-readable storage medium of claim 16, wherein the estimating the three-dimensional position of the first type landmark further includes determining the first position and the second position respectively by estimating a position of the image capturing device based on position information of the vehicle and the digital map.

18. The non-transitory computer-readable storage medium of claim 17, wherein the determining the first position and the second position includes:

obtaining initial position information of the image capturing device by matching a landmark indicator on the digital map corresponding to initial position information of the vehicle onto the image captured by the image capturing device; and determining the first position and the second position based on the position of the image capturing device calculated based on a matching error between the image and the landmark indicator on the digital map corresponding to each of a plurality of candidate position information performed sampling based on the initial position information of the image capturing device and driving information of the vehicle.

19. The non-transitory computer-readable storage medium of claim 13, wherein the estimating the position of the second type landmark includes calculating, as the position of the second type landmark, an intersection of the virtual plane and a three-dimensional vector passing coordinates identified as the second type landmark on the image from an origin of a coordinate system for the image capturing device.

20. The non-transitory computer-readable storage medium of claim 19, wherein the estimating the position of the second type landmark further includes:

obtaining, as a candidate group, a plurality of position information on the position of the second type landmark calculated for the single first type landmark while changing the position of the image capturing device; and correcting the calculated position of the second type landmark based on the candidate group.

* * * * *